United States Patent [19]

Jackson et al.

[11] Patent Number: 4,857,353

[45] Date of Patent: Aug. 15, 1989

[54] DRY MIX FOR MICROWAVE LAYER CAKE

[75] Inventors: Glenn M. Jackson, Mound; John G. Roufs, Maple Grove, both of Minn.

[73] Assignee: General Mills, Inc., Minneapolis, Minn.

[21] Appl. No.: 192,579

[22] Filed: May 11, 1988

[51] Int. Cl.$^4$ ............................................. A21D 10/04
[52] U.S. Cl. .................................... 426/554; 426/243; 426/549
[58] Field of Search ............... 426/554, 553, 243, 549, 426/496

[56] References Cited

U.S. PATENT DOCUMENTS

| | | |
|---|---|---|
| 3,161,524 | 12/1964 | Opie et al. . |
| 3,516,836 | 6/1970 | Shea . |
| 3,526,516 | 9/1970 | Howard et al. . |
| 3,708,309 | 1/1973 | Johnson et al. . |
| 4,185,127 | 1/1980 | Radlove . |
| 4,275,088 | 6/1981 | Hart et al. ............................ 426/549 |
| 4,419,377 | 12/1983 | Seward et al. . |
| 4,431,681 | 2/1984 | Hegedus et al. . |
| 4,461,782 | 7/1984 | Robbins et al. ..................... 426/549 |
| 4,668,519 | 5/1987 | Dartey et al. . |

OTHER PUBLICATIONS

SOLKA-FLOC ® Powdered Cellulose Technical Bulletin from James River Corp.

*Primary Examiner*—George Yeung
*Attorney, Agent, or Firm*—John A. O'Toole

[57] ABSTRACT

Disclosed are dry culinary mixes for use in preparing baked goods, especially microwave layer cakes. The dry mixes employ high levels of a defined nucleating agent(s). The dry mixes enable the consumer to bake a cake using microwave radiant energy comparable to a conventionally oven baked cake in quality, structure, volume, and texture. The nucleating agent can be any water insoluble minute material having a particle size of 20-200 microns. Preferred nucleating agents are particularly sized microcrystalline cellulose particles.

20 Claims, No Drawings

DRY MIX FOR MICROWAVE LAYER CAKE

TECHNICAL FIELD

This invention relates to food products and particularly to improved dry culinary mixes for microwave layer cakes. More particularly, the present invention relates to the addition to such mixes of defined sizes of nucleating agents in small but effective quantities to materially improve important characteristics of the finished baked cakes obtained from such mixes.

BACKGROUND OF THE INVENTION

The use of prepared mixes for baking cakes has received wide usage, particularly in home baking. So-called "dry" prepared mixes for layer cakes are made by combining sugar, flour, shortening, leavening and other ingredients including perhaps milk solids, egg solids, flavoring and coloring to form a free-flowing granular mixture. To prepare cake batters from these dry mixes for baking, liquid materials such as water, liquid shortening, milk and eggs are added and the combination is then beaten both to form a homogeneous mixture and to incorporate air. The resulting batter is then baked to obtain finished cakes.

Cakes can vary markedly in many respects, including such physical properties as density, grain size and grain size distribution, cell wall thickness, center to edge ratios, total moisture, moisture activity, crumb softness, moisture retentivity, specific volume, center point height, etc. Cakes can also differ markedly in such organoleptic properties as texture, mouthfeel, gumminess and off-tastes. Alteration of the dry mixture formulation to realize cakes differing in any one attribute generally yield concomitant changes, often detrimental, in several other attributes. Thus, dry mix formulations typically must balance increases in a desired cake attribute against undesirable changes in others.

Traditionally, consumers preferred dry mixes which produced cakes having a fine, uniform, thin-walled grain structure and having fine crumbs. The air cells have been small, but numerous and generally evenly distributed throughout the interior of the cake. Such cakes typically have high specific volumes (a type of density). Such cakes are typically prepared from high sugar to flour ratio cake mixes formulated with low protein or "cake" flour and with emulsified shortening. However, consumer taste fashion presently favors higher moistness-impression cakes characteristic of "from scratch" cakes. Such cakes are characterized differently by higher moisture levels and crumb softness but similarly with respect to many other finished cake attributes.

The formulation of culinary mixes for baked goods such as layer cakes for the at-home preparation of layer cakes by conventional overbaking is highly developed. However, present consumer trends for even greater convenience have given rise to desires for culinary mixes for layer cakes to be prepared by microwave baking.

Batters from consumer culinary mixes designed for oven baking can be microwave baked. However, the quality of finished baked goods from microwave baking, e.g., microwave layer cakes can suffer from numerous qualitative deficiencies. For example, when a conventional oven baking dry mix is prepared into a batter and microwave baked, the finished layer cake texture can be finetextured and spongy. Often, specific gravities are much higher. Also, pronounced variations from edge to center are observed. The center can be soggy, more dense, while the edges are overly dry. Rather than a desirable slight peaking in the center (center to edge ratio of about 1.25), even center point depressions can occur ($<1.00$).

Many deficiencies in finished layer cake quality are caused or aggravated by a fundamental difference in the baking mechanism between oven and microwave baking. In microwave baking, the pan and the solid ingredients, generally, are relatively microwave inert and are not heated while the liquids, especially the moisture, are heated. In direct contrast, in oven baking, the pan and solid structure are heated relatively quickly while the moisture is heated more slowly. Also, microwave energy has a limited depth of penetration. Furthermore, the microwave energy itself interacts with cake ingredients to cause deliterious textural changes in the finished product. As a result, while both oven baking dry mixes and microwave baking mixes will both include flour, sugar, shortening and flavorings, the highly developed formulation technology of oven baking dry mixes provides very little guidance for formulating microwave culinary dry mixes.

The prior art does include compositions and methods for microwave culinary dry mixes which are taught to be useful for microwave baking (see for example, U.S. 4,419,377 entitled Cake Mix Containing a Lipophilic Emulsifier System, issued Dec. 6, 1987 to Seward et al.). Furthermore, consumer dry goods products have recently become commercially available, (see for example, Microwave Chocolate Cake Mix brand layer cake dry mix available from The Pillsbury Co.). While useful, there is a continuing need for new and improved microwave dry mixes useful in the preparation of microwave baked goods. Surprisingly, multiple end product quality attributes are dramatically improved by formulating dry mixes comprising leavening systems which include the present, defined nucleating agents.

The present invention provides improved dry mix compositions and methods for the preparation of microwave baked goods. Surprisingly, multiple end product quality attributes are dramatically improved by formulating dry mixes comprising leavening systems which include defined nucleating agents. The present dry mixes provide the advantages of increased tolerance to variations in the microwave power capacities of the various microwave ovens as well as tolerance to variations in liquids addition. The resultant finished layer cakes of the present invention exhibit smaller differences in volume, grain structure, surface irregularities, crumb moisture and bottom wet spottiness than can occur due to variations in microwave power and/or liquids addition.

SUMMARY OF THE INVENTION

In its product aspect, the present invention relates to improved microwave dry culinary mixes which provide improved finished microwave layer cakes. The finished layer cakes exhibit enhanced volume and center to edge ratios as well as superior general cake quality which have been microwave baked compared to conventional culinary mix layer cakes.

The present dry mixes comprise from about 20% to 50% by weight of the dry mix of wheat flour, from about 30% to 55% by weight of sugar. The sugar to flour ratio in the dry mix ranges from about 1.10 to 1.35.

The present dry cake mixes additionally essentially comprise from about 5% to 20% by weight of an emulsified shortening and from about 0.1% to 4% of a chemical leavening agent. The present microwave dry culinary mixes also essentially comprise from about 0.1% to 5% by weight of a small particle size, water insoluble, water binding nucleating agent. The nucleating agent(s) has a particle size of from about 20 to 200 microns.

In its method aspect, the present invention embraces methods for improving batters for layer cake and to microwave methods for baking a layer cake. The present methods for improving batters for layer cakes comprise the steps of adding to a batter from about 0.1% to 5% by weight (solids basis) of the present nucleating agents. The present invention further includes microwave methods for preparing layer cakes which methods employ the present dry mixes.

DETAILED DESCRIPTION OF THE INVENTION

The improved dry mixes for microwave layer cakes of the present invention produce finished microwave layer cakes which exhibit enhanced volume and center point height as well as superior texture and grain structure. The dry mixes essentially comprise wheat flour, sugar, emulsified shortening, chemical leavening agents, color/flavoring materials and defined nucleating agents. Each of these ingredients as well as optional components and dry mix composition preparation and use and the present microwave baking methods are discussed in detail below.

Throughout the specification and claims, percentages and ratios are by weight and temperatures are in degrees Fahrenheit, unless otherwise indicated.

A. Flour

The present dry mix compositions essentially contain from about 20% to 50% of the dry mix of flour. Better results are achieved when the flour level ranges from about 35% to 45% by weight of the dry mix. The flour(s) useful in the dry mixes of the present invention can be of conventional type and quality. Wheat flours are preferred but other flours conventionally used in the preparation of layer cakes can also be employed in full or partial substitution for the wheat flour. Traditional cake flour has about 8% or less protein by weight of the flour. Pastry flour ordinarily has a protein level of about 10%. Other flours such as bread flour generally have higher protein levels of about 11% to 13% by weight. The preferred protein range for the wheat flour useful in this invention is between about 9% to 10% by weight of the flour. This protein range permits easy removal of the cake from the pan. A good general all-purpose flour also can be used. Such all-purpose flour generally comprises a mixture of both hard and soft wheat flours, i.e., both high protein level and low protein level flours. Such flours are useful if the average protein content ranges from about 8% to 10% by weight.

In one preferred embodiment where ingredient cost is less of a concern, the flour ingredient can be an instantized flour. Instantized flours are flours which have been agglomerated. Employment of such instantized flours (e.g., Wondra ® brand flour available from General Mills, Inc.) provides the benefit of rapid hydration of the mix into a batter, thus eliminating the need for extensive mixing for batter formation and batter aeration.

The present invention is particularly useful when instantized flour is employed since ready to bake batters are typically prepared by simple mixing with a few fork strokes and no batter aeration step is employed. Conventionally, batter aeration is important in achieving high volumes in the finished cake and comprises the mixing or beating of the batter for several minutes at high speed in order to achieve incorporation of air into the batter. Batter aeration creates air cells in the batter which expand upon baking to form the crumb structure of the cake.

B. Sugar

The dry mix compositions of the present invention also essentially comprise from about 30% to 55% sugar(s). Typically, sucrose is used in cake mixes as the sugar ingredient although up to about 15% of the sugar in the present dry mix can be supplied by dextrose. Commercially available sugar usually contains up to about 4% starch as an aid to maintaining its free-flowing properties. Preferably, the sugar is included in the mix in amounts of from about 40% to 45% by weight of the mix.

The baker's ratio is the weight ratio of sugar to flour. High ratio cakes have long been preferred for texture and keeping quality. The present cake mixes essentially have a weight ratio of sugar to flour of about 1:1 to 1:1.35. Better results are achieved when the sugar to flour ratio in the present mixes ranges from about 1:1.19 to 1.21.

In a preferred embodiment, a substantial portion of the sugar ingredient is finely ground. Finely ground sugars aid the pourability of the present dry mixes, particularly when plastic shortening is used at high levels. Better results are achieved when at least 50% by weight of the sugar component has an average particle size of 50 microns or below. The remainder of the sugar component can be supplied by conventional granulated sugar.

C. Shortening Component

The instant dry mix compositions also essentially comprise from about 5% to 20% of an emulsified shortening ingredient. Preferably, the present dry mix compositions comprise from about 8% to about 13% of the shortening ingredient. Best results are obtained when the shortening component comprises from about 9% to 11% of the present dry mix compositions. Maintenance of shortening concentrations within these limits is essential for the realization of dry mixes in the form of free-flowing particles. Such concentrations are also important in providing cakes of acceptable textural quality.

Conventional shortening materials are suitable for use as the shortening ingredient of the present dry mixes. Such conventional shortening materials are well known in the cake mix preparation art. The conventional shortenings useful herein are fatty glyceridic materials which can be classified on the basis of their physical state at room temperature. Liquid shortenings can be used in the present dry mix compositions and provide the advantage of ease of incorporation into dry mixes. Solid shortening can also be used and provide the advantage of desirable mouthfeel upon cake consumption. More commonly, and preferred for use herein, mixtures of liquid and solid shortenings are used in dry mixes. Such mixes can be fluid or plastic depending in part upon the level of solid fatty materials. Shortenings of this type comprise a liquid oil containing from about 2% to 26% normally solid fatty glycerides. That is, a solids content index ("SCI") at 70° and 4% to 6% at 100° F.

The solid fatty glycerides can include fatty monoglycerides and diglycerides of saturated fatty acids having 16 to 22 carbon atoms. The liquid shortening can be animal, vegetable or synthetic oil which is liquid at ordinary room temperatures. Representative of such liquid shortenings are coconut oil, palm kernel oil, cottonseed oil, peanut oil, olive oil, sunflower seed oil, sesame seed oil, corn oil, safflower oil, poppy seed oil, soybean oil, rape seed oil, babassue oil and the like. Other suitable shortening materials and methods of shortening preparation as described in detail in Bailey, "Industrial Oil and Fat Products," (3rd ed. 1964) which is incorporated herein by reference.

Conventionally, the shortening ingredient of cake mixes is emulsified. That is, the shortenings provide a convenient carrier for addition of emulsifiers to the dry mix. Such emulsifiers aid the realization of cakes with improved grain structure and cake texture. The emulsifier typically comprises from about 1% to 20% of the shortening component, preferably from about 5% to about 15% and, most preferably from about 10% to 15%.

The exact amount of emulsifier used is determined by the particular emulsifier employed and specific desired finished cake attributes. The art is replete with emulsifiers which are suitable for inclusion in the shortening component for the provision of cake mixes for layer cakes. Thus, selection of particular emulsifiers will pose no problems for the skilled artisan.

Partially esterified polyhydric compounds having surface active properties are exceptionally suitable for use herein. This class of emulsifiers includes among others, mono- and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Other examples include the partial esters of hydroxy carboxylic acids, such as lactic, citric, and tartaric acids with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

D. Chemical Leavening Agent

Another essential ingredient of the present dry mixes is a chemical leavening agent. The chemical leavening comprises from about 0.1% to 4% of the present dry mixes, preferably from about 1% to 3% of the dry mixes.

In the broadest aspects, any general chemical leavening or system can be employed in the formulation of culinary dry mixes for layer cakes. In general, such systems are composed of a baking soda, e.g., sodium, potassium, or ammonium bicarbonate, etc., as a source of carbon dioxide on one hand, and one or more other common baking acids on the other. In conventional culinary mixes formulated for oven baking of layer cake mixes the preferred chemical leavening system includes any baking soda and a mixture of baking acids. The baking acid mixture typically comprises a first, slow-reacting baking acid and a second, fast-reacting baking acid. In contrast, in the present preferred embodiment the leavening acid preferably comprises only fast acting acids. In the most preferred embodiments, the leavening acid works at room temperatures. Exemplary useful acids are selected from the group consisting of citric acid, lactic acid, acetic acid, propionic acid, cream of tartar, monocalcium phosphate monohydrate, fast acting sodium acid pyrophosphate and mixtures thereof. The preferred acid is monocalcium phosphate monohydrate. The weight ratio of the baking acid to the baking soda is about 0.75:1 to 1.25:1, preferably about 1:1.

E. Nucleating Agents

An essential ingredient of the present dry mixes is a minutely sized, insoluble nucleating agent. While not wishing to be bound by the proposed theory, it is speculated herein that insoluble particulates aid in the formation of fine and evenly divided air cells in the final cake. The present particulate material may act to provide nucleating sites for the rapidlyforming carbon dioxide which is liberated from the fast-reacting leavening system. Cakes with a fine and evenly-divided structure have been associated with higher quality attributes. The usefulness of the present nucleating agents is especially evident when agglomerated flours are employed and when the methods of preparation exclude the conventional batter aeration step.

Useful materials as nucleating agents include any edible, water insoluble material so long as the material has a particle size ranging from about 20 microns to about 200 microns, preferably about 100 to 150 microns. The preferred particle size is about 120 microns. Exemplary useful materials include calcium carbonate, fumed silicon dioxide and especially insoluble cellulosic materials. Mixtures can also be employed. The cellulosic materials can be purified, e.g., microcrystalline cellulose, or impure such as various insoluble bran sources, e.g., wheat bran, rice bran. However, water soluble cellulosic materials, e.g., hydroxypropyl cellulose, or materials having high levels of water soluble constituents, e.g., oat bran, are to be avoided.

The avoidance of water soluble materials, however, should not be confused with water absorption or water binding features which, while not critical per se, are helpful to the provision of the benefits taught herein. Indeed, preferred materials are selected from the group consisting of microcrystalline cellulose, cellulose flour, powdered cellulose and mixtures thereof. These materials are those which have water binding qualities. These water binding qualities impart to the present dry mixes the desirable qualities of tolerance to variation in layer cake preparation, especially regarding variations in liquids addition as well as to variations in bake times and microwave power. The material of choice for use as the nucleating agent is microcrystalline cellulose.

It is essential herein that the improved microwave dry mixes comprise about 0.1% to 5% (dry basis), preferably about 0.8% to 1.8% of the nucleating agent. For best results, a concentration of about 1.5% is desired. When impure sources of cellulosic materials, e.g., apple powder, are employed only the cellulosic portion or fraction should be considered within the concentration range. (e.g., if an apple powder is 20% cellulosic fiber and 10% apple powder is employed in a dry run formulation, this is approximately 2% of the nucleating agent.)

Optionally, adjuvant water binding materials can be added to the dry mixes. Such adjuvant water binding materials are especially helpful when nonwater binding materials are employed as the nucleating agents, e.g., fumed silicon dioxide or calcium carbonate. If present, such adjuvant water binding materials can comprise from about 0.1% to 3% of the dry mix. Suitable materials include xanthan gum, guar gum, pregellatinized starch, and, especially carboxymethylcellulose which is a cellulosic material that has been chemically modified to be water soluble.

F. Optional Components

The present dry mixes containing nucleating agents can optionally contain a variety of additional ingredients suitable for rendering finished cakes prepared therefrom more organoleptically desirable. Such optional dry mix components include flavor/coloring agents, especially cocoa, egg white solids, salt, coloring agents, flavoring agents, nuts and fruit. If present, such optional components comprise from about 1% to 8% of the dry mixes of the present invention.

Another highly preferred optional ingredient in the present dry mix compositions is nonfat dry milk solids. Nonfat dry milk solids aid the structuring of the cake foam. If present, such dry milk solids can comprise from about 0.5% to 2.0% of the present mixes.

DRY MIX COMPOSITION PREPARATION

The cake mixes of the present invention are prepared by blending the essential and optional components together in such a conventional manner as to produce a free-flowing dry mix. In a preferred method of dry mix preparation, the flour, the sucrose, the shortening, the leavening agent and any optional ingredients are blended in a ribbon blender for a period of about 8 to 20 minutes at a mix temperature below about 65° F. When a liquid oil is part of the shortening ingredient, then the oil is normally added during blending by means of an oil spray or by extruding the blend mixture through a spreader bar. Blending is continued after introduction of the oil until the oil lump count is from about 10% to 15% by weight on a number 10 U.S. Standard sieve. Best results are obtained when the temperature of the mix after blending is from about 65° to 70° F.

The mix is subsequently finished in a standard commercial finisher. Finishers are devices for reducing shortening lump size and for more intimately incorporating the shortening into a mix by impact mixing. Thus, finishing the mix in a finisher is highly preferred when the shortening component comprises a plastic shortening. Commercially available finishers generally include an exposure on which are mounted rapidly rotating blades. After finishing to insure reduction in lump count, larger sized optional ingredients such as nuts and fruits are then blended into the mix. The present dry mixes are then packaged in a conventional manner in conventionally suitable container which typically hold specific weights of the dry mix.

DRY MIX COMPOSITION USE

The present dry mixes are conveniently prepared into finished cakes in the conventional manner by forming an aerated batter by mixing the dry mix in a household electric mixer, for example, for two minutes at medium or high speed, after having added water or other aqueous liquid, oil and eggs or egg whites to the mix to form an improved batter having about 20% to 40% moisture, 0 to 30% oil, and 0 to 5% egg solids. In those preferred embodiments which comprise quick mixing flours such as agglomerated flour, only simple mixing (i.e., with a fork or spoon) after liquids addition for about one minute is required to form a batter and the step of batter aeration is eliminated.

Thereafter, a suitable quantity of the batter resulting from the mixing process is poured into a microwave cake pan, (i.e., microwave transparent) and microwave baked for sufficient times, for example, for 2 to 4 minutes at full power, to form a finished microwave layer cake. Better results are observed in smaller sized pans such as those ranging from about 3 to 7 inches in width, 5 to 10 inches in length and filled to a batter depth of about 1 to 3 inches. It is to be appreciated that smaller sized portions can also be made, e.g., cupcakes, without departing from the spirit of the present invention. Also, by minor modification of ingredient concentrations and selection within the scope of the above description, other comparable baked goods, e.g., muffins, can also be prepared.

The resultant finished microwave layer cake is characterized by good volume, crumb texture and good center to edge ratios, e.g., ranging from about 1:05 to 1.30, preferably 1:1 to 1.25:1.

The following examples are offered to further illustrate but not to limit the invention disclosed herein:

EXAMPLE 1

A dry mix for a yellow layer cake is prepared from the following ingredients:

| Ingredient | Weight % |
| --- | --- |
| Sucrose | 43.28 |
| Agglomerated flour | 38.08 |
| Shortening (with 16% emulsifier) | 9.70 |
| Dextrose | 2.43 |
| Pregellatinized waxy maize starch | 1.50 |
| Cellulose flour[1] | 1.50 |
| Butter Vanilla Flavor | 1.00 |
| Sodium bicarbonate | 0.80 |
| Monocalcium phosphate monohydrous | 0.80 |
| Salt | 0.77 |
| Sodium carboxymethylcellulose | 0.10 |
| Yellow color No. 32 | 0.04 |
|  | 100.00 |

[1]Available from James River under the trade name Solka-Floc ®, grade BW-20 FCC, having an average particle size of 100 microns.

About 205 g of the above formulation is admixed with 110 g water, 45 g of vegetable oil and one egg, with a fork in a 5×7×2.5 inch microwave pan until a smooth batter is formed. Thereafter, the batter is microwave heated for 5 to 8 minutes (with periodic quarter rotations) to form a microwave layer cake.

EXAMPLE 2

A dry mix for a microwave cake mix is prepared having the following formulation:

| Ingredient | Weight % |
| --- | --- |
| Sugar | 32.20 |
| Flour | 28.48 |
| Shortening[1] | 13.07 |
| 36 DE corn syrup | 2.89 |
| Dextrose | 2.89 |
| Baking powder | 2.07 |
| Mono & Diglycerides | 1.49 |
| Salt | 0.74 |
| Xanthan gum | 0.03 |

-continued

| Ingredient | Weight % |
| --- | --- |
| Butter vanilla flavor | 0.39 |
| Sodium 2-stearyl lactylate | 0.14 |
| Lecithin | 0.06 |
| Sodium caseinate | 0.06 |
| Absorbic acid | 0.06 |
| Citric acid | 0.51 |
| Sodium bicarbonate | 0.77 |
| Powdered cellulose[2] | 4.85 |
| Vegetable oil | 1.87 |
| Egg white powder | 2.45 |
| Egg yolk powder | 4.98 |
| | 100.00% |

[1] A blend of animal and vegetable fats with about 16% total emulsifier.
[2] Available from James River Corporation under the trade name SOLKA-FLOC® SW-40FCC having an average particle size of 120 microns.

About 100 g of the above formulation is admixed with 75 g water with a fork in a 5×7×2.5 inch microwave pan until a smooth batter is formed. Thereafter, the batter is microwave heated for 2 to 5 minutes to form a microwave layer cake.

EXAMPLE 3

A dry mix for microwavable muffin mix is prepared having the following formulation:

| Ingredient | Weight % |
| --- | --- |
| Flour (regular) | 36.67 |
| Sugar | 31.23 |
| Sodium bicarbonate | 0.95 |
| Salt | 0.82 |
| Cinnamon | 0.47 |
| Nutmeg | 0.11 |
| Cloves | 0.09 |
| Shortening | 17.69 |
| Apple powder[1] | 4.00 |
| NFDM | 1.43 |
| Citric acid | 0.09 |
| Egg yolk powder | 3.18 |
| Egg white powder | 1.52 |
| Cellulose powder[2] | 1.75 |
| | 100.00 |

[1] An apple powder having about 20% cellulose content.
[2] SOLKA FLOC® BW200 FCC available from James River Corp. and having an average particle size of 35 microns.

100 g of the dry mix is prepared into a batter by admixture with 62.5 g water with a fork until wetted and portions of the batter are added to four microwave compatible containers. The batter portions are then microwave heated for two minutes at high power to form microwave muffins.

What is claimed is:

1. A culinary mix useful in the preparation of a layer cake or muffin which upon microwave baking yields a baked good of improved volume and texture, comprising:
   A. about 20% to 50% by weight of the mix of flour;
   B. about 30% to 55% by weight (dry basis) of the mix of sugar, the ratio of sugar to flour being about 1:1 to 1.7:1;
   C. about 5% to 20% by weight of the mix of shortening, said shortening comprising
      (1) about 90% to 99% fatty triglycerides, and
      (2) about 1% to 10% of an emulsifier;
   D. about 0.1% to 5% by weight of the mix of a nucleating agent, said nucleating agent being water insoluble and having a particle size ranging from about 20 microns to about 200 microns and selected from the group consisting of microcrystalline cellulose, cellulose flour, powdered cellulose, silicon dioxide, calcium carbonate and mixtures thereof;
   E. about 0.1% to 4% by weight of the dry mix of a leavening system consisting essentially of
      (1) a baking soda,
      (2) a solid, fast acting leavening acid selected from the group consisting of citric acid, lactic acid, acetic acid, propionic acid, cream of tartar, monocalcium phosphate monohydrate, fast acting sodium acid pyrophosphate and mixtures thereof and wherein the weight ratio of baking soda to acid ranges from about 1:0.75 to 1.25.

2. The culinary mix of claim 1 wherein the nucleating agent ranges in particle size from about 100 to 150 microns.

3. The culinary mix of claim 2 wherein the flour is agglomerated.

4. The culinary mix of claim 3 wherein the nucleating agent is selected from the group consisting of microcrystalline cellulose, cellulose flour, powdered cellulose and mixtures thereof.

5. The culinary mix of claim 4 wherein the leavening acid is monocalcium phosphate monohydrate.

6. The culinary mix of claim 5
   wherein the nucleating agent has a particle size of about 120 microns, and
   wherein the weight ratio of baking soda to acid ranges from about 1 to 1.

7. The culinary mix of claim 6 additionally comprising 0.5% to 2% by weight of nonfat dry milk solids.

8. A process for improving a layer cake batter system useful for the microwave preparation of a layer cake consisting essentially of flour, sugar, shortening, water, and leavening which comprises incorporating into the batter about 0.1% to 5% by weight (dry basis) of a water insoluble nucleating agent for air cell development, said agent ranging in size from about 20 to 200 microns.

9. The method of claim 8 wherein the leavening consists essentially of
   (1) a baking soda,
   (2) a solid, fast acting leavening system selected from the group consisting of a solid, fast acting leavening acid selected from the group consisting of citric acid, lactic acid, acetic acid, propionic acid, cream of tartar, monocalcium phosphate monohydrate, fast acting sodium acid pyrophosphate and mixtures thereof and wherein the weight ratio of baking soda to acid ranges from about 1:0.75 to 1.25.

10. A microwave baking method for preparing a microwave layer cake type baked good of superior volume comprising the steps in sequence of:
   A. admixing water or milk and a dry mix to form a batter, said dry mix comprising
      about 20% to 50% by weight of the dry mix of flour;
      about 30% to 55% by weight (dry basis) of the mix of sugar, the ratio of sugar to flour being about 1:1 to 1.7:1;
      about 5% to 20% by weight of the dry mix of shortening, said shortening comprising
      (1) about 90% to 99% fatty triglycerides, and
      (2) about 1% to 16% of an emulsifier;
      about 0.1% to 4% by weight of the dry mix of a leavening system consisting essentially of
      (1) a baking soda, (2) a solid, fast acting leavening acid selected from the group consisting of citric acid, lactic acid, acetic acid, propionic acid, cream of tartar, monocalcium phosphate monohydrate, fast acting sodium acid pyrophosphate and mixtures thereof and wherein the weight ratio of baking soda to acid ranges from about 1:0.75 to 1.25, and about 0.1% to 5% by weight (dry basis) of the dry mix of a water insoluble nucleating agent for air cell development ranging in particle size from about 20 to 200 microns selected from the group consisting of microcrystalline cellulose, cellulose flour, powdered cellulose, silicon dioxide, calcium carbonate and mixtures thereof; and thereafter B. microwave baking the batter in a microwave compatible container for a time sufficient to form a finished baked good.

11. The culinary mix of claim 10
wherein the nucleating agent ranges in particle size from about 100 to 150 microns.

12. The culinary mix of claim 11
wherein the flour is agglomerated.

13. The culinary mix of claim 12
wherein the nucleating agent is selected from the group consisting of microcrystalline cellulose, cellulose flour, powdered cellulose and mixtures thereof.

14. The culinary mix of claim 13
wherein the leavening acid is monocalcium phosphate monohydrate.

15. The culinary mix of claim 14
wherein the nucleating agent has a particle size of about 120 microns, and
wherein the weight ratio of baking soda to acid ranges from about 1 to 1.

16. The culinary mix of claim 8
wherein the nucleating agent ranges in particle size from about 100 to 150 microns.

17. The culinary mix of claim 16
wherein the flour is agglomerated.

18. The culinary mix of claim 17
wherein the nucleating agent is selected from the group consisting of microcrystalline cellulose, cellulose flour, powdered cellulose and mixtures thereof.

19. The culinary mix of claim 18
wherein the leavening acid is monocalcium phosphate monohydrate.

20. The culinary mix of claim 19
wherein the nucleating agent has a particle size of about 120 microns, and
wherein the weight ratio of baking soda to acid ranges from about 1 to 1.

* * * * *